June 17, 1952   J. A. LOGAN   2,601,041
CONTROLLING MECHANISM FOR FLUE CLEANING
MEANS FOR HEATING APPARATUS
Filed June 11, 1949   3 Sheets-Sheet 1
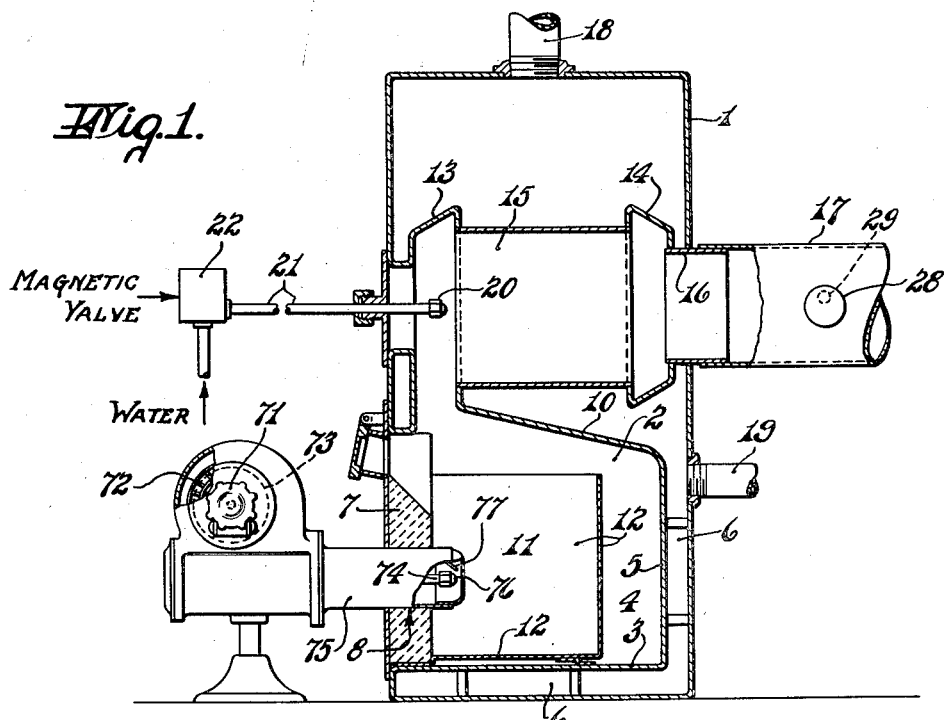
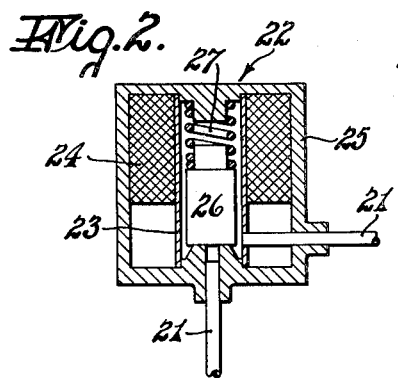
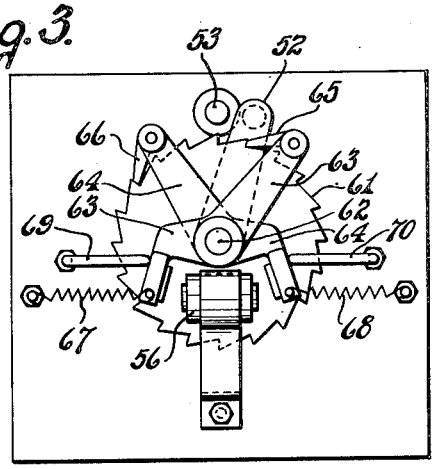
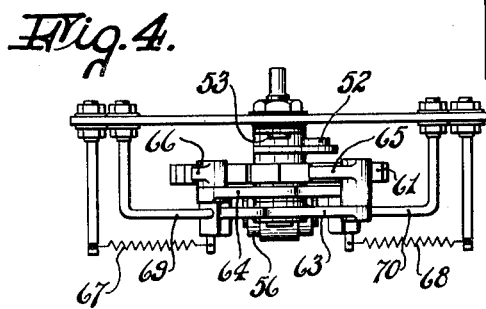
INVENTOR
JOSEPH A. LOGAN
BY Chapin & Neal
ATTORNEYS

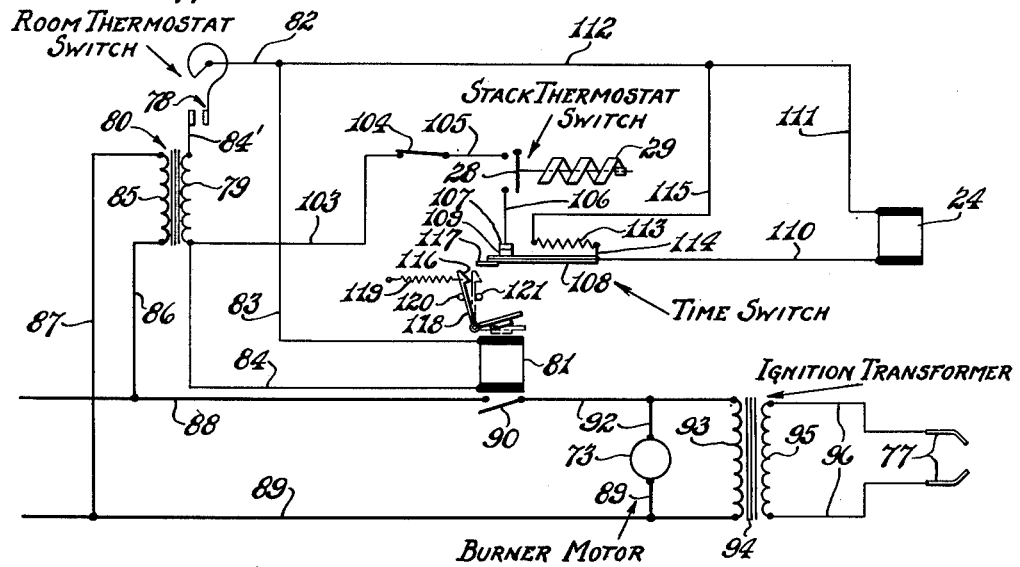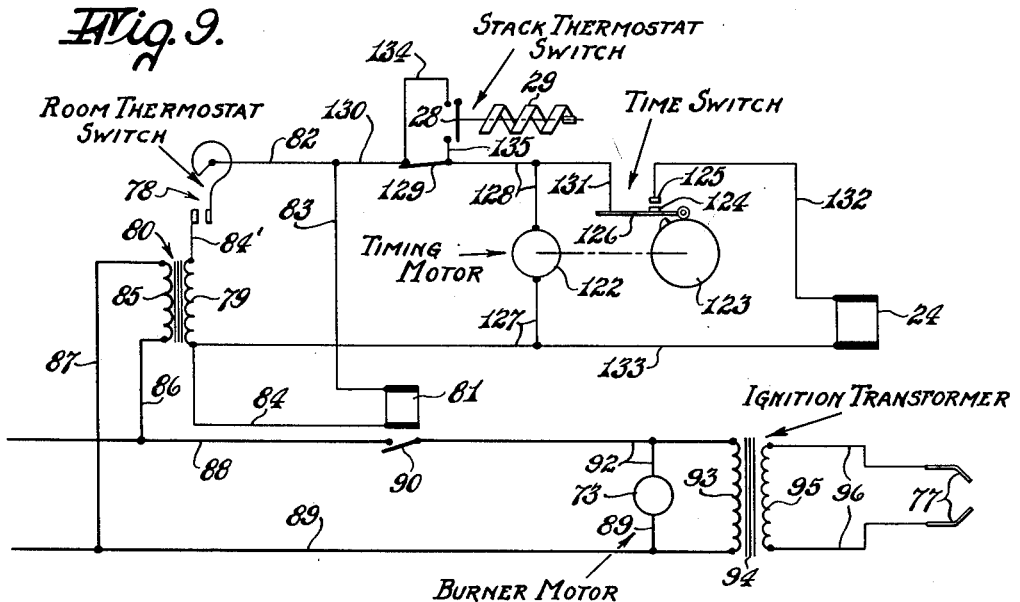

Patented June 17, 1952

2,601,041

UNITED STATES PATENT OFFICE 2,601,041

CONTROLLING MECHANISM FOR FLUE CLEANING MEANS FOR HEATING APPARATUS

Joseph A. Logan, Hadley, Mass., assignor to Gilbert & Barker Manufacturing Company, West Springfield, Mass., a corporation of Massachusetts Application June 11, 1949, Serial No. 98,445

7 Claims. (Cl. 158—28)

This invention relates to an apparatus which is automatically operable from time to time to clean the flues or gas passages of a heating apparatus, such as a steam or hot water boiler or a warm air furnace.

The invention has for an object the provision of a spray nozzle, which is adapted for connection to a supply of water under suitable pressure and which is located and adapted to emit a spray of water into one of the gas passages of the heating apparatus for a predetermined time interval, while the temperature of the heating apparatus is high enough to convert the water spray into steam, which serves to remove soot from the walls of the gas passages.

The invention has for another object the provision of a thermostat, responsive to the temperature at some location in the gas passages of the heating apparatus, for determining when such passages are hot enough to receive and vaporize the water spray.

The invention has for another object the provision of a time delay means for determining when the gas passages of the heating apparatus are hot enough to receive and vaporize the water spray by postponing the start of the water spray for such a time after the start of the burner, used to fire such apparatus, as will suffice for the burner to raise the temperature in the gas passages of the heating apparatus to the desired value.

Other objects of the invention relate to means for controlling the frequency of operation of the spray with respect to the cycles of operation of the burner, whereby the water spray may operate a number of times during each such cycle, only once during each cycle, only once in a predetermined number of cycles, or only when there is a sufficient accumulation of soot in the heating apparatus to require cleaning.

The invention may be carried out in various ways and several illustrative examples are shown in the accompanying drawings, in which:

Fig. 1 is a sectional elevational view of a heating apparatus embodying the invention;

Fig. 2 is a sectional view of the water control valve;

Fig. 3 is a view showing the construction of the selector switch;

Fig. 4 is a fragmentary plan view thereof;

Figs. 8 and 9 are diagrammatical views of control systems for the water spray apparatus, illustrating other forms of timing means.

Figure 5:
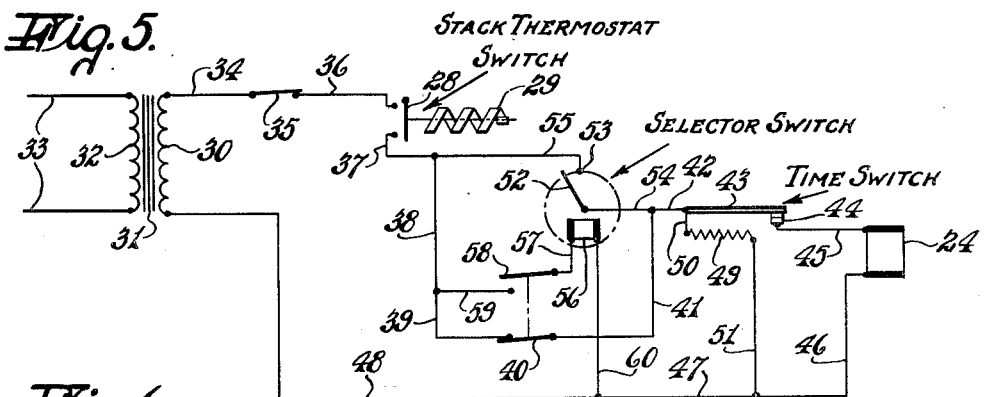
Fig. 5 is a diagrammatical view of a control system therefor activated by a burner thermostat.

Referring to these drawings; there is shown in Fig. 1 a steam boiler having a steel shell 1 with in the lower portion of which is located a combustion chamber 2. The latter has a bottom wall 3, side walls 4, and back wall 5—such walls being of steel and surrounded by water legs 6—and a front wall 7, consisting of a refractory block having a central opening 8 to receive the air tube of an automatic oil burner. The crown sheet 10 of combustion chamber 2 slopes in an upwardly and forwardly direction from the back wall 5. Within chamber 2 is an inner combustion chamber 11 formed by side, back and bottom walls 12 of stainless-steel and the aforesaid refractory wall 7. The inner combustion chamber 11 is open at its upper end. Above the combustion chambers 2 and 11 is a heat exchanger, comprising front and rear headers 13 and 14, respectively, interconnected by a plurality of laterally-spaced and horizontally-extending flues 15, between which are vertical water passages. The lower part of front header 13 connects with the combustion chamber 2 just forwardly of the front edge of the crown sheet 10. The rear header 14 is connected by a thimble 16 to the stack 17. The steam outlet of the boiler is shown at 18 and the return pipe at 19.

The boiler, thus briefly described, will serve as an illustrative example of one form of heating apparatus with which the invention may be used. Obviously, the invention may equally well be used with warm air furnaces or hot water boilers and is generally independent of the particular form and construction of the heating apparatus.

Figure 7:
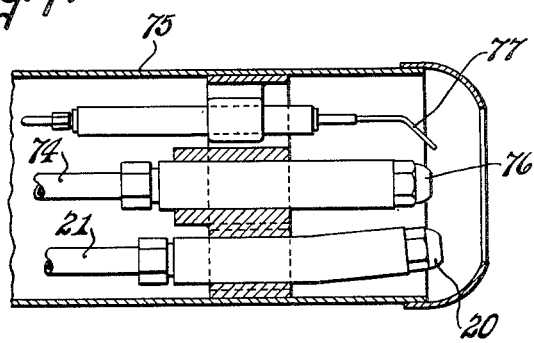
Fig. 7 is a fragmentary sectional elevational view showing the mounting of the spray nozzle on the burner used to fire the heating apparatus.

This invention provides a spray nozzle 20, mounted on the inner end of a supply conduit 21, the outer end of which is adapted for connection to a suitable source of water under pressure, which may be the city water mains, if the pressure is adequate, or, if not, to a suitable pumping means (not shown). Interposed in conduit 21 is a suitable control valve 22 for starting and stopping the flow of water to the nozzle. The nozzle may be of any suitable type. As an example of one suitable type, the nozzle may be of the well known pressure-atomizing type, such as is used in oil burners for atomizing oil. This particular nozzle is arranged, for example, to deliver a spray, when supplied with water at a pressure of around 100 pounds per square inch. The capacity of the nozzle may be varied as desired. A nozzle, having a capacity of 10 gallons per hour, when operated at the above-named pressure, is now thought suitable. The nozzle is located in any suitable way to direct its spray into any desired part of the heating apparatus where soot may accumulate. As shown in Fig. 1, the nozzle may be located to deliver its spray directly into the flues 15. As shown in Fig. 7, the nozzle may be mounted in the air tube of an oil burner so that the spray may also be delivered into the combustion chamber. There may be more than one nozzle, such as 20, if desired. As used herein, the term "gas passages" is meant to include any chamber, compartment or flue, through which the gases from combustion pass and on which soot may be deposited as a result of combustion. The nozzle 20 delivers a spray of water into the gas passages of the heating apparatus while the latter is hot enough to vaporize the water and convert it into steam. The latter, as is well known, is an excellent means for removing soot from those interior walls of the heating apparatus which are exposed to the products of combustion.

The valve 22 may be electromagnetically controlled. A solenoid valve of any standard type available in the market, may be used. One such valve is shown in conventional form in Fig. 2. This valve includes a thin cylinder 23 of non-magnetic material, surrounded by a solenoid 24, enclosed in a casing 25. The cylinder 23 is closed at its upper end by casing 25, which also closes its lower end except for an outlet to the conduit 21. The conduit has an inlet to cylinder 23 located above the outlet. Within cylinder 23 is a valve 26 of magnetic material, pressed downwardly by a spring 27 against the base of cylinder 23 to close the outlet to the conduit 21 and nozzle 20. When solenoid 24 is energized, the plunger 26 will be lifted, allowing water to pass to nozzle 20.

The solenoid 24 may be controlled in various ways. In Fig. 5, it is controlled by a switch 28, actuated by a thermostat 29, which is responsive to the temperature of the heating apparatus. In Fig. 1, the switch 28 is indicated as a so-called stack thermostat with its sensitive element 29 located to respond to the temperature in stack 17 and thus indirectly to the temperature in the interior of the heating apparatus. This switch may be set to close when the temperature in the stack rises to some predetermined value above the boiling point of water. In some cases it may be set to close at say 400° Fahrenheit, which insures that the walls of the gas passages of the heating apparatus are hot enough to convert the water spray into steam. This switch may also be otherwise set for another purpose as will be later described.

The control circuit of Fig. 5 receives its energy from the secondary 30 of a transformer 31, the primary 32 of which is adapted for connection to a pair of wires 33 of a 110 volt A. C. supply. One terminal of secondary 30 is connected by a wire 34 to one terminal of a manual switch 35, the other terminal of which is connected by a wire 36 to one contact of switch 28. The other contact of switch 28 is connected by wires 37, 38 and 39 to one terminal of a second manual switch 40, the other terminal of which is connected by wires 41 and 42 to the bi-metallic element 43 of a time switch. The stationary contact 44 of the latter is connected by a wire 45 to one terminal of solenoid 24 and the other terminal of the latter is connected by wires 46, 47 and 48 to the other terminal of secondary 30. With the arrangement, as thus far described, the stack thermostat switch 28 closes, when the temperature in the gas passages of the heating apparatus is sufficiently high, and completes the circuit described for energizing solenoid 24, whereby valve 26 is opened to start the water spray. The time switch is actuated by an electric heating coil 49 connected by wires 50 and 51 to wires 42 and 47, respectively, and thus being energized when switch 28 closes. This coil 49, when energized for a predetermined time, say 10 seconds for example, will open the time switch by the bending of member 43 away from the stationary contact 44. Thus, the water spray will be automatically stopped after it has been in operation for a predetermined time.

It may not always be desirable to operate the water spray each time the heating apparatus is fired. Especially is this so, when the apparatus is fired by an automatic burner which operates on relatively short runs and may start and stop many times each day. Therefore, there is provided, for optional use, when desired, a selector switch, which is arranged to close the described energizing circuit only once in a number, say for example ten, of firing operations. This switch selects the firing cycle during which the water spray will operate. This switch is indicated in Fig. 5 by the blade 52 and contact 53, which are respectively connected by wires 54 and 55 to wires 42 and 37. When the manual switch 40 is closed the selector switch is shunted out. When switch 40 is open, the selector switch is rendered operative. It is controlled by an electromagnet 56, one terminal of which is connected by a wire 57, a switch 58, and wire 59 to the wire 38. The other terminal of magnet 56 is connected by a wire 60 to wire 48. The switch 58 is connected to switch 40 to open and close, when switch 40 closes and opens, respectively. Thus when switch 40 is open the switch 58 will be closed and the only circuit then closed by thermostat switch 28 will be through magnet 56. This, as will be later described in detail, will actuate the selector switch 52 one step in a counterclockwise direction. When the magnet 56 is subsequently deenergized the selector switch 52 will be moved another step in the same direction. Successive closings and openings of switch 28 will cause blade 52 to be turned step by step counterclockwise until it engages contact 53, when a circuit will be closed to the time switch to energize solenoid 24. As before, the solenoid will be deenergized by the time switch after a predetermined time.

An exemplary form of selector switch is shown in Fig. 3. The switch blade 52 is fixed to a ratchet wheel 61 having, for example, 20 teeth. Pivotally mounted on the supporting stud 62 of ratchet 61 are two levers 63 and 64, one on each side of the ratchet. The levers 63 and 64 have pivotally mounted on their upper ends pawls 65 and 66 respectively. The lower ends of levers 63 and 64 are yieldingly held by springs 67 and 68 respectively against fixed stops 69 and 70. The electromagnet 56 is arranged between the lower ends of the levers 63 and 64, which are of magnetic material. When the magnet is energized, the levers are moved simultaneously but in opposite directions. The lever 63 will be moved counterclockwise and its pawl 65 will move ratchet 61 counterclockwise one tooth or 18 degrees. The lever 59 will be moved clockwise one tooth or 18 degrees without turning the ratchet. On deenergization of magnet 56, the springs 67 and 68 will respectively move levers 63 and 64 against their stops 67 and 68. The lever 63 will thus be moved clockwise and its pawl 65 will move idly over the ratchet by the space of one tooth. The lever 64 will be moved counterclockwise by the amount of one tooth and its pawl 66 will turn ratchet 61 counterclockwise by the amount of one tooth. The ratchet is thus turned one step each time the burner thermostat switch 28 closes and another step each time such switch opens. The arrangement is such that on the tenth energization of magnet 56 the switch blade 52 will come to rest in engagement with contact 53 and on the immediately following deenergization of this magnet the blade will move out of engagement with this contact.

Another plan of operation involves setting the burner thermostat switch to close at some temperature above the normal stack temperature, which would prevail when the interior walls of the gas passages are relatively free from soot. Such normal stack temperature may, for example be 600 degrees Fahrenheit. The burner thermostat would then be set to close at, say 625 degrees Fahrenheit. When soot accumulates on the walls of the gas passages, the stack temperature will rise above normal. When it rises to a predetermined extent, say 25 degrees, the water spray will be started. Thus, the water spray may be automatically brought into operation only when it is needed, as manifested by a rise above normal in stack temperature, which rise indicates an accumulation of soot and the need for cleaning.

In Fig. 1, there is also shown an automatic oil burner for firing the heating apparatus. The burner shown is of the well known gun type and includes an oil pump 71 and fan 72 driven by an electric motor 73 for respectively supplying oil and air to an oil conduit 74 and air tube 75. On the inner end of conduit 74 is a pressure-atomizing nozzle 76 for producing a spray of finely divided oil particles to mix with air supplied through tube 75. The combustible mixture is ignited by a spark produced between the electrodes 77 and the flame issues into the inner combustion chamber 11 from which the hot gases rise into the combustion chamber 2 and thence into header 13, and through flues 15, header 14, and thimble 16 into the stack 17.

The oil burner described will serve as an illustrative example of one form of automatic burner with which the invention may be used. The invention is of general application and may be used with any type of automatic burner and regardless of the kind of fuel used. The invention is therefore generally independent of the particular form and construction of the burner.

A burner, such as shown, is usually automatically started and stopped by a room-thermostat switch, accordingly as the temperature in the selected room is respectively below or above a predetermined value. A schematic control is illustrated in connection with the control system shown in Fig. 6. The room-thermostat switch is marked 78. It controls a low voltage circuit, supplied by the secondary 79 of a transformer 80 and containing the electromagnet 81 of a relay. This circuit includes the wires 82, 83, 84 and 84' which join the switch 78, secondary 79 and electromagnet 81 in series. The primary 85 of transformer 80 is connected by wires 86 and 87 to the supply wires 88 and 89 of a suitable source of electricity, say 110 volts A. C. The wire 89 is connected to one terminal of motor 73. The wire 88 is connected to the other terminal of the burner motor 73 through a switch 90 and a wire 92. The switch 90 is closed by magnet 81, when energized. The primary 93 of an ignition transformer 94 is connected to wires 89 and 92 in parallel with motor 73. The secondary 95 of transformer 94 is connected by wires 96 to the ignition electrodes 77. On a demand for heat from the burner, switch 78 closes and magnet 81 is energized to close switch 90 and start motor 73 and energize the ignition transformer 94. When the demand for heat is satisfied, switch 78 opens, deenergizes magnet 81 and causing switch 90 to open the circuit to motor 73 and the ignition transformer 94. The burner control has been shown merely in simplified and conventional form. Actually, the control would include various well known safety devices and accessories, not necessary to consider here.

Figure 6:
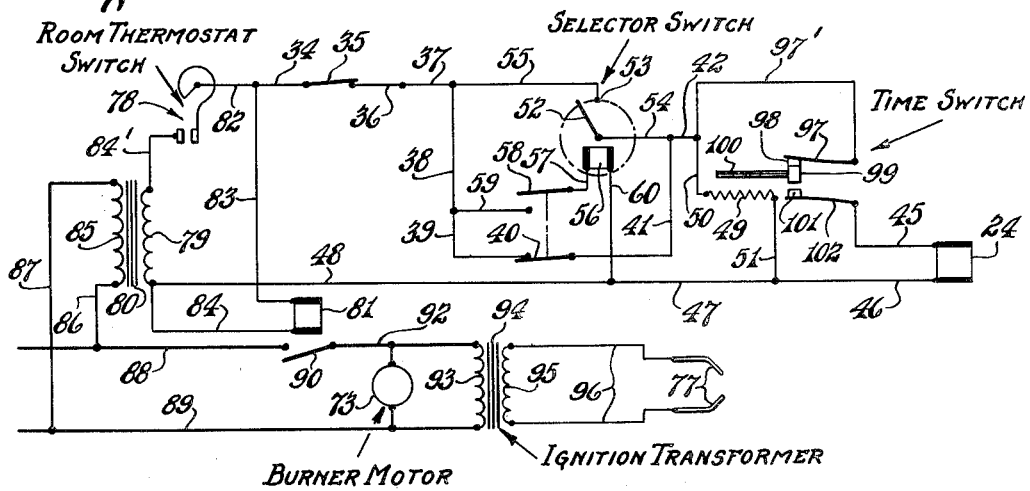
Fig. 6 is a diagrammatical view of a second form of control system activated by an automatic burner used to fire the heating apparatus.

The operation of the water spray means may be made contingent on the operation of the burner, as shown in Fig. 6. Here, a control system, substantially the same as that described in Fig. 5, is shown as supplied by the secondary 79 of the transformer 80 of the burner control system and controlled by the room thermostat switch 78, instead of by the stack thermostat switch 28. Corresponding parts in Figs. 5 and 6 have been given the same reference numerals. The burner thermostat 28 has been eliminated and the wires 36 and 37 have been connected together. The wire 48 is connected to one terminal of secondary 79 and the wire 34 is connected to wire 82 and thus through switch 78 and wire 84' to the other terminal of the secondary. A time switch is used, as in Fig. 5, but it is of somewhat different construction in order to provide for a time delay between the starting of the burner and the starting of the water spray. This time switch includes a spring blade 97, which is connected by a wire 97' to the wire 42 and which carries a contact 98. The blade 97 tends to swing downwardly, as far as permitted by a contact 99 on a bi-metallic member 100, pressing its contact 98 against contact 99. Beneath contact 99 is a contact 101, carried by a spring blade 102, which is connected to wire 45 and thus to one terminal of solenoid 24. The bi-metallic member 100 is heated by the electric heating coil 49. With this arrangement, the heating coil 49 is energized, when the burner starts, and heats the bi-metallic member 100 causing it to bend downwardly. As member 100 moves downwardly, the spring 97 bends downwardly, keeping its contact 98 engaged with contact 99. As this action continues, contact 99 eventually engages contact 101 and closes the energizing circuit to solenoid 24, thereby causing water to be admitted to spray nozzle 20. The opening of the valve is thus delayed for a predetermined interval, which may for example be five minutes, after the starting of the burner. After the water valve has been opened, the bi-metallic member continues to move downwardly, causing blade 102 to bend downwardly. All the contacts 98, 99 and 101 are maintained in engagement for a short interval, which may for example be 10 seconds, after which the contact 98 separates from contact 99, due to the inability of spring 97 to bend downwardly any further. Hence, the energizing circuit to solenoid 24 is broken and the water valve closes. After the burner stops, the heating coil 49 is deenergized and the bi-metallic member 100 bends backwardly until it reaches its original and illustrated position, thus resetting the parts in readiness for another operation. With this arrangement, the water spray cannot start until a predetermined time after the burner starts. As before, the spray may occur once during each cycle of firing or, if the selector switch is used, once in a certain number of cycles. If the selector switch is not used, the time delay may be made long enough so that the water spray will not occur during those short burner runs, used solely for the purpose of heating the domestic water supply. Thus, the spray can be made to occur only during the longer runs, used for house heating. As before, the duration of the water spray is timed.

In the preceding controls, the heating coil of each time switch remained energized during the entire cycle of firing of the heating apparatus in order to maintain the bi-metallic member heated and keep the time switch open until the end of the cycle. In Fig. 8, an alternative arrangement is shown for holding the time switch open and resetting it at the end of the firing cycle. Here the energizing circuit for solenoid 24 comprises a wire 103 extending from one terminal of the secondary 79 of the burner control transformer 80 to one terminal of a manual switch 104, a wire 105 connecting the other terminal of switch 104 to one terminal of the burner thermostat switch 28; a wire 106 connecting the other terminal of switch 28 to the contact 107 of a time switch; a bi-metallic thermostat 108 operating a contact 109 initially engaged with contact 107; a wire 110 connecting the element 108 to one terminal of solenoid 24; and wires 111 and 112 connecting the other terminal of solenoid 24 to wire 62 and thus through switch 78 and wire 84' to the other terminal of the secondary 79 of transformer 80. The electric heating coil 113 for the thermostat 108 is respectively connected by wires 114 and 115 to the thermostat 108 and wire 112. The energizing circuit for coil 113 is the same as that for solenoid 24 up to and through the thermostat 108 and thence extends through wire 114, coil 113, wires 115, 112 and 82, room thermostat switch 78 and wire 84' to secondary 79. Thus, when the thermostat 108 separates contacts 107 and 109, in order to deenergize solenoid 24, it will also deenergize coil 113. To prevent the contacts 107 and 109 from reengaging when the thermostat 108 cools, a latch 116 is provided to engage a member 117, fixed to the free end of the thermostat. The latch is fixed to the upstanding arm of a bellcrank 118, pivoted intermediate its ends. The horizontal arm of bellcrank 118 is of magnetic material and overlies the end of relay coil 81. A spring 119 tends to hold the upstanding arm of the bellcrank against a fixed stop 120, and when the bellcrank is so positioned, the latch 116 lies out of the path of the member 117. When the room thermostat switch 78 closes and energizes relay coil 81 to close switch 90 and start the burner motor 73 and energize the ignition transformer 94, the coil 81 will attract the horizontal arm of bellcrank 118 and move the latter into the dotted line position against a fixed stop 121. The latch now lies in the path of member 117. When the thermostat 108 bends downwardly to separate contacts 107 and 109 and deenergize solenoid 24 and heating coil 113, the member 117 will be engaged by latch 116 and held thereby against return movement for the remainder of the cycle of operation of the burner. When the burner stops, the magnetic attraction of coil 81 on bellcrank 118 ceases and the spring 119 pulls latch 116 out of engagement with member 117, allowing the thermostat 108 to move back and engage contacts 107 and 109. A time switch of the type just described can be used with either of the previously described control systems, if desired.

Another form of timing means is shown in Fig. 9. Here, an electrical timing motor 122 is arranged to drive a cam 123, which controls the closing and opening of a pair of contacts 124 and 125. The contact 125 is stationary and the contact 124 is carried by a spring blade 126 fixed at its left hand end. The spring of this blade tends to separate the contacts. The cam acts on the right hand end of blade 126 and flexes it upwardly, causing the contacts 124 and 125 to engage. One terminal of the timing motor 122 is connected by a wire 127 to one terminal of the secondary 79 of the burner control transformer 80. The other terminal of motor 122 is connected by a wire 128 to one terminal of a manual switch 129, the other terminal of which is connected by a wire 130 to wire 82 and thus through room thermostat switch 78 and wire 84' to the other terminal of the secondary. Thus, each time the switch 78 closes to start the burner, the timing motor 122 will be started. This motor may be constructed to make one revolution in say 10 minutes. The cam is constructed, once each revolution, to engage the contacts 124 and 125, hold them engaged for a predetermined interval, say ten seconds and then allow the contacts to separate. As before, these contacts control the solenoid 24. The blade 126 is connected by a wire 131 to wire 128; the contact 125 is connected by a wire 132 to one terminal of solenoid 24; and the other terminal of the latter is connected by a wire 133 to wire 127. Thus, each time the contacts 124 and 125 engage and disengage, the solenoid 24 will be energized and deenergized, respectively. The burner control, shown in Fig. 9, is the same as that shown in Fig. 8 and corresponding parts in these two figures have been given the same reference numerals. A timing motor of the type just described might be used in place of the time switch shown in the previously described control systems. This last-described motor is useful where repeated operations of the water spray are desired during one firing cycle. This type of timing device also has the merit of simplicity. It does not, however, provide for the energization of solenoid 24, a predetermined time after the start of a firing cycle.

If desired, in order to insure that the timing motor of Fig. 9 does not start until the heating apparatus is sufficiently hot, the previously described stack thermostat switch 28 may be used. In Fig. 9, switch 28 has been shown as connected by wires 134 and 135 to the terminals of hand switch 129. Consequently, by opening switch 129, the stack thermostat switch can be placed in series with the control circuit for timing motor 122. Switch 28 will then be effective to delay the starting of the timing motor 122 until the heating apparatus has been heated to the desired temperature.

In all of the forms disclosed, the invention provides for the emission of a water spray into the gas passages of the heating apparatus, when the temperature therein is at or above that necessary to convert the water spray into steam. The determination of when the interior of the heating apparatus is hot enough for the purpose may be effected by a means responsive to the temperature in the gas passages of the heating apparatus, such as the stack thermostat for example, or by means set into action, when the burner starts, to delay the opening of the control valve for the water spray until the burner has operated long enough to raise the temperature of the heating apparatus sufficiently for the purpose.

The frequency with which the water spray is used may vary with particular conditions encountered and with individual desires. The invention provides a variety of arrangements to meet various conditions or desires. The frequency of water spray operation may be selected to suit various conditions or the individual wishes of various users. The water spray may be made to occur a plurality of times during each cycle of firing operation of the burner, once during each cycle, once during a predetermined number of cycles, or, ideally, only when needed, as manifested by an accumulation of soot in the heating apparatus, which accumulation causes a rise above normal in the stack temperature of the heating apparatus and brings the water spray into operation. The heating apparatus may be treated with frequent sprays, each of short duration, or with less frequent sprays, each of longer duration.

The time intervals given in the preceding description are to be taken as illustrative examples. The length of the time delay between the start of the burner and the start of the water spray may be varied within wide limits, as desired, as may also the duration of the water spray. These time intervals are not critical and the invention is therefore not dependent on them.

It will be understood that the cleaning apparatus, herein described, may be used for spraying into the heating apparatus any other liquid suitable for the purpose. Sometimes, certain boiler cleaning compounds may be dissolved in the water before it is sprayed. It is therefore intended that the term water spray, as used herein, shall cover any equivalent liquid suitable for the purpose.

What is claimed is:

1. The combination with an electrically-operated fluid-fuel burner adapted to fire into a heating apparatus and means for starting and stopping the burner to produce a cycle of operation thereof, of a supply conduit for water under pressure, a nozzle connected to said conduit and adapted to be mounted to direct a spray of water into the heating apparatus for cleaning soot therefrom when the burner is positioned to fire into such apparatus, a valve in said conduit, timing means controlling the opening and closing of said valve and operable to delay the opening of such valve for a predetermined interval after the starting of said burner, and selector means for coupling the timing means to the starting and stopping means of the burner operable to effect such coupling once in a predetermined number of cycles of operation of the burner.

2. The combination with an electrically-operated fluid-fuel burner adapted to fire into a heating apparatus, and means for starting and stopping the burner to produce a cycle of operation thereof, of a supply conduit for water under pressure, a nozzle connected to said conduit and adapted to be mounted to direct a spray of water into the heating apparatus for cleaning soot therefrom when the burner is positioned to fire into such apparatus, a valve in said conduit, means responsive to the temperature in the heating apparatus and operable when rendered effective to open said valve when such temperature rises to a predetermined value, selector means for rendering said temperature responsive means effective during certain cycles of operation of the burner and ineffective during other cycles, and timing means activated upon opening of said valve and operable to close the valve in a predetermined time after its opening.

3. The combination with an electrically-operated fluid-fuel burner adapted to fire into a heating apparatus and switch means for starting and stopping the burner, of a supply conduit for water under pressure, a nozzle on said conduit and adapted to be located to direct a spray of water into the heating apparatus for cleaning the same when the burner is positioned to fire into such apparatus, a valve in said conduit to start and stop the flow to said nozzle, an electromagnet operable when energized and deenergized to respectively open and close said valve, an energizing circuit for said electromagnet, a first and initially open switch in said circuit, a second and initially-closed switch in said circuit, means responsive to temperature in the heating apparatus for closing the first switch after said switch means starts the burner, actuating means in said circuit for opening the second switch in a predetermined time after the closing of the first switch to open said circuit, latching means engageable by the second switch when it opens to hold the latter open, and means for releasing the latching means and actuated by said switch means when it stops the burner.

4. The combination with an electrically-operated fluid-fuel burner adapted to fire into a heating apparatus and switch means for starting and stopping the burner, of a supply conduit for water under pressure, a nozzle on said conduit and adapted to be located to direct a spray of water into the heating apparatus for cleaning the same when the burner is positioned to fire into such apparatus, a valve in said conduit to start and stop the flow to said nozzle, electrical means controlling the opening and closing of said valve, an energizing circuit for said electrical means, a first time switch in said circuit operable to close the same a predetermined time after the first-named switch starts the burner and energize said electrical means to open said valve, and a second time switch operable a predetermined time after the closing of the energizing circuit to open the same and deenergize said electrical means to close said valve.

5. The combination with an electrically-operated fluid-fuel burner adapted to fire into a heating apparatus, an energizing circuit for the burner, and a switch in said circuit for starting and stopping the burner, of a supply conduit for water under pressure, a nozzle connected to said conduit and adapted to be located to deliver a spray of water into the heating apparatus for cleaning the same when the burner is positioned to fire into such apparatus, a valve in said conduit to start and stop said spray, electrical means controlling the opening and closing of said valve, an energizing circuit for said last-named means connected to said first-named circuit, a time switch in the second circuit, and electrical means for controlling the opening and closing of the time switch and the interval during which it is closed, said last-named electrical means being connected to the first-named circuit and controlled by the switch that starts and stops the burner.

6. The combination with an electrically-operated fluid-fuel burner having a tube adapted for connection to a heating apparatus, a spray nozzle mounted in said tube, electrically-operated means for respectively delivering air and fluid fuel to said tube and nozzle, an energizing circuit for said means, and a switch in said circuit to start and stop said means, of a supply conduit for water under pressure and supported from the air tube of the burner, a nozzle connected to said conduit and adapted to deliver a spray of water into the heating apparatus when said tube is connected thereto, a valve in said conduit to start and stop said spray, electrical means controlling the opening and closing of said valve, an energizing circuit for said last-named means, a time switch in the second circuit, and electrical means for controlling the opening and closing of the time switch and the interval during which it is closed, said last-named electrical means being connected to the first-named circuit and controlled by the switch that starts and stops the burner.

7. The combination with an electrically-operated fluid-fuel burner having a tube adapted for connection to a heating apparatus, a spray nozzle mounted in said tube, electrically-operated means for respectively delivering air and fluid fuel to said tube and nozzle, an energizing circuit for said means, and a switch in said circuit to start and stop said means, of a supply conduit for water under pressure and supported from the air tube of the burner, a nozzle connected to said conduit and adapted to deliver a spray of water into the heating apparatus, said nozzle being mounted to direct its spray in the same general direction as the spray from the nozzle of the burner, a valve in said conduit to start and stop said spray, electrical means controlling the opening and closing of said valve, an energizing circuit for said last-named means connected to said first-named circuit, a time switch in the second circuit, and electrical means for controlling the opening and closing of the time switch and the interval during which it is closed, said last-named electrical means being connected to the first-named circuit and controlled by the switch that starts and stops the burner.

JOSEPH A. LOGAN.

REFERENCES CITED

The following references are of record in the file of this patent:

UNITED STATES PATENTS

| Number | Name | Date |
| --- | --- | --- |
| 1,236,793 | Warman | Aug. 14, 1917 |
| 1,847,468 | Bowers | Mar. 1, 1932 |
| 2,110,533 | Snow et al. | Mar. 8, 1938 |